March 29, 1955 G. J. STREZYNSKI 2,705,202
PRODUCTION OF MALT EXTRACT
Filed March 1, 1952
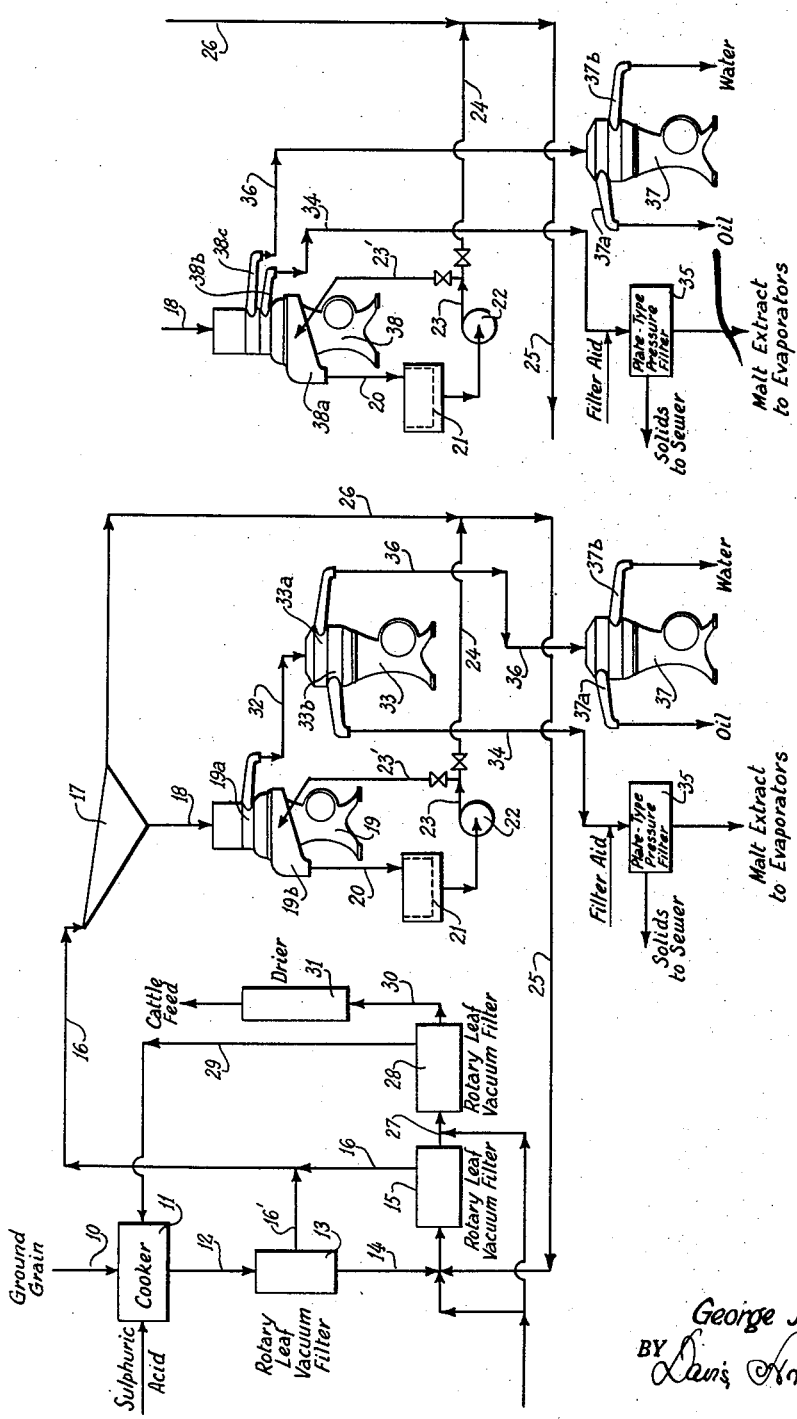
INVENTOR.
George J. Strezynski
BY Davis, Hoxie, Faithfull

United States Patent Office 2,705,202
Patented Mar. 29, 1955

2,705,202
PRODUCTION OF MALT EXTRACT

George J. Strezynski, Poughkeepsie, N. Y., assignor to The De Laval Separator Company, Poughkeepsie, N. Y., a corporation of New Jersey Application March 1, 1952, Serial No. 274,319

15 Claims. (Cl. 99—27)

This invention relates to the production of malt extract from a mash prepared from grain. More particularly, the invention relates to an improved process for this purpose which simplifies the overall operations, renders them more effective and, at the same time, as an end result, enables the recovery of substantially pure grain oil as a by-product.

Conventional processes used heretofore in malt extract production generally comprise a three-stage filter operation, followed by a pass through a pressure type polishing filter using fiber aid. In such processes, a mash is prepared by mixing ground corn, water and a small amount of sulphuric acid. The mixture is cooked in a conventional cooker. After cooking, the mash is fed to the first stage of a three-stage filter system. The solids discharged from the first filter are mixed with water and fed to the second filter. The filtrate from both the first and second filters is usually subjected to a polishing step in a plate-type pressure filter using filter aid. The filtrate from this last operation is dehydrated to obtain the malt extract in the desired condition. The solids from the pressure filter are passed to the sewer or other disposal means. The solids discharge from the second of the three-stage filter system is slurried with water and fed to the third-stage filter. The solids discharge from this filter, being rich in proteins, is passed through a dryer and sold for cattle feed. The filtrate from the third-stage filter is returned to the cooker as part of the make-up water. The filtrate from the first and second filters contains, in addition to the malt extract, some fine solids and corn oil. In conventional processes such as described above, the fines and oil contained in this last-mentioned filtrate are removed by the pressure-type polishing filter using a filter aid. The solids discharge from the pressure-type polishing filter contains the corn oil, and the same is not recoverable due to the presence of the filter aid.

The principal object of the present invention is to provide a process for producing malt extract, in which a higher yield of corn oil is obtained as a by-product than has been possible previously, and in which the malt extract is of better quality and is obtained more economically than heretofore.

According to this invention, a mash is prepared as heretofore described and passed through the first two of the conventional three-stage filter arrangement prior to a centrifugal separation step. Specifically, the mash is fed to the first filter and the solids discharge therefrom reslurried with water and fed to the second filter. The filtrate from the first and second filters preferably is subjected to a screening operation and the liquor then fed into a conventional two-way centrifugal separator. The centrifuge separates the filtrate into sludge and effluent as relatively heavy and light constituents, respectively, and discharges the same as separate streams.

The sludge from the centrifuge is preferably returned to the system as part of the make-up water for the slurry prepared from the solids discharge of the first-stage filter. The tailings from the screening operation prior to the centrifuging are preferably returned to the system at the same point. The effluent discharge from the centrifuge contains the malt extract in a concentrated form and, in addition, corn oil and water. In order to obtain the malt extract by itself, the effluent is subjected to a second centrifugal operation wherein the extract is separated from the corn oil and water phase. The separated malt extract may then be dehydrated to obtain the desired consistency in a conventional manner.

The liquor from the screening operation may be fed into a three-way centrifugal separator which will separate and continuously discharge as separate streams (1) sludge, (2) effluent containing concentrated malt extract, and (3) oil and water. In either event, the mixture of grain oil and water from the centrifuge is then subjected to a further centrifugal separating operation in a centrifugal oil purifier to separate the oil from the water.

In order to increase the efficiency of operation of the primary centrifuging step, whether the same be a two or three phase centrifugal separator, it is preferred that the sludge constituent discharged therefrom be divided into two streams, one of which is returned to the peripheral portion of the separating chamber in order to maintain the sludge discharged from the separator in a thickened condition, and the other of which is returned to and mixed with the slurry fed to either the second or third filter.

For a better understanding of the invention, reference may be had to the accompanying drawing in which Figure 1 is a schematic diagram of a complete system adapted to practice the process according to this invention; and Figure 2 is a schematic diagram showing the manner in which a conventional three-way centrifugal separator may be arranged in the system.

Referring now to the drawing, a mixture of ground corn slurried with water and a small amount of sulphuric acid is fed through a pipe 10 into a cooker 11 where the same is cooked until most of the starch contained in the grain has been converted to sugar (malt extract), at which time the cooked mash is withdrawn from the cooker via pipe 12 and fed to the first filter 13 of the three-stage filter arrangement. All of these filters preferably are of the rotary-leaf vacuum type. The sludge from filter 13 is reslurried with water in pipe 14 to extract any sugar trapped in the solids and fed to the second filter 15. The filtrates from both of the filters 13 and 15, which contain some solids and the extracted sugar, is fed through pipes 16', 16, and 18, and preferably through a vibrating screen 17 for removing the coarser of the suspended solids, to the bowl of a centrifugal separator 19. The separator bowl of the centrifuge 19 is a conventional two-way separation type, such as that disclosed in U. S. Patent No. 2,500,101, issued to George J. Strezynski on March 7, 1950. In this bowl, the filtrate from the filters 13 and 15 is centrifugally separated into an inner annulus or effluent containing the extracted sugar, the corn oil, and water, and an outer annulus comprising mainly sludge. The effluent is discharged from the central part of the bowl into the upper cover 19a of the centrifuge 19, and the sludge is discharged through nozzles (not shown) in the outer periphery of the bowl into the lower cover 19b of the centrifuge.

The sludge discharged from the centrifuge is fed through pipe 20 to a screened receiving tank 21 and preferably a portion is returned to the system by pump 22 through pipes 23, 24 and 25 to the reslurrying point in pipe 14 between the first and second filters 13 and 15, respectively. Alternatively, the screened sludge from tank 21 could be returned to the system at the reslurrying point in pipe 27 between the second and third filters 15 and 27, respectively. The tailings from the screening operation at 17 prior to the centrifuging may also be returned advantageously to the system via pipes 26 and 25 at either of the reslurrying points.

The sludge from the second filter 15 is reslurried with water in pipe 27 to extract the remainder of any undissolved malt sugar and fed to third filter 28. The filtrate from this last filter is returned to the system through pipe 29 as make-up water in the cooker 11 while the sludge, which is rich in proteins, is passed through pipe 30 to dryer 31 and further processed for cattle feed.

Part of the sludge discharged from cover 19b of the centrifuge 19 into tank 21 may advantageously be returned to the separating chamber of the centrifuge through pipe 23', preferably at the outer part of the chamber near the discharge nozzles, in the manner disclosed in my prior-mentioned patent.

The effluent from centrifuge 19, which is discharged through cover 19a of the centrifuge, contains the extracted malt sugar in a concentrated form together with the corn oil and water, and is fed through pipe 32 to a second centrifuge 33 of conventional type for separating two liquids. In the centrifuge 33, the malt extract is separated and discharged as the heavier phase from the lower cover 33b of the centrifuge, and the corn oil and water is separated and discharged as the lighter phase from the upper cover 33a. The malt extract phase preferably is slurried in pipe 34 with a small quantity of filter aid and passed through a plate-type pressure filter 35 to remove any remaining traces of solids before the final concentration of the extract in the evaporators (not shown). The water and oil phase discharged from the bowl of separator 33 through cover 33a is passed through pipe 36 to a conventional oil purifier 37 of the centrifugal type wherein the oil is separated from the water phase and these constituents separately discharged through covers 37a and 37b, respectively, of that centrifuge.

As has been mentioned before, a single centrifugal separator adapted to effect centrifugally a three-way separation may be utilized in place of the primary and secondary centrifugal separation steps shown and described for Fig. 1. Such an arrangement is shown in Fig. 2, wherein the combined filtrate containing the malt extract from the three-stage filter system is passed through pipe 18 to the separator bowl of a conventional three-way centrifugal separator 38 such as that shown and described in U. S. Patent No. 2,513,687, issued to George J. Strezynski on July 4, 1950. In a separator of this type, the filtrate is centrifugally separated into an outer annulus comprising most of the sludge, an intermediate effluent annulus of clarified effluent containing most of the malt extract, and an inner effluent annulus comprising a mixture of corn oil and water. The components forming the sludge, clarified effluent, and oil and water phases are separately discharged through outlet covers 38a, 38b and 38c respectively, and are from there passed through pipes 20, 34, and 36, respectively, to the screened tank 21, the plate-type pressure filter 35, and the centrifugal oil purifier 37, respectively, shown in Fig. 1.

The following is a specific example applicable to the practice of my process: In the cooker 11, 14,000 lbs. of the mash are prepared. The combined filtrates from the filters 13 and 15 flows through pipe 16 at a rate of 1800 gal./hr. and contains 4% by volume of solids, although up to 6% gives satisfactory results. This combined filtrate has a Brix reading of 10° and is at a temperature of 150° F. The sludge is discharged from the first-stage centrifuge through the lower cover 19b (or 38a) at a rate of 550 gal./hr. and contains 45% solids by volume. The effluent discharged from centrifuge 19 through cover 19a is 1,250 gal./hr. and contains from ½ to 2% solids. From the cover 38b of centrifuge 38, the effluent is discharged at a rate of about 1,250 gal./hr. with ½ to 2% solids, and from cover 38c the oil and water mixture is discharged at a rate of 2–3 gal./hr. with a trace of solids. The sludge from centrifuge 19 is recirculated to the slurry point in pipe 14 (Fig. 1) at 200 gal./hr. and contains 45% solids, while the sludge from centrifuge 38 (Fig. 2) is recirculated to the slurry point in pipe 14 at 200–300 gal./hr. with the same solids content. (In each case, the sludge so recirculated to the slurry point should be about 4 to 15% of the total feed to the first centrifuge.)

The new process enables the recovery of grain oil and an additional amount of sludge, both valuable by-products contained in the final sludge heretofore sent to the sewer or other disposal point in conventional malt extract production processes. In the new process, practically all of the grain oil (which heretofore has been completely unreclaimable due to contamination by the required filter aid used in the plate type pressure filter) is recovered and made available for sale. Aso, the fine solids normally discharged from the pressure filter (and likewise heretofore unreclaimable due to the presence of filter aid) are recovered and returned to the system, thereby increasing considerably the total amount of solids made available for processing as cattle feed. Since only a small amount of fine solids is present in the centrifugally clarified effluent (malt extract) passed to the plate-type pressure filter for final polishing, only small amounts of filter aid will be required for the operation of this apparatus. Accordingly, it may be said that the labor cost for cleaning the pressure-type filter and the cost of filter aid used therein is greatly reduced by the practice of the improved process. Also, due to the relatively small amounts of solids passed through the filter, extended periods of continuous operation without cleaning are made possible.

I claim:
1. In the production of malt extract from a cooked grain mash by subjecting the cooked grain mash to a first filtering operation and there obtaining a first filtrate containing crude malt extract and a first solids discharge, preparing a slurry including the first solids discharge and water, and subjecting the slurry to a second filtering operation and there obtaining a second filtrate containing crude malt extract and second solids discharge, the improvement which comprises combining and feeding the filtrates into a locus of centrifugal force and there separating them into sludge and effluent phases as relatively heavier and lighter constituents, respectively, the effluent phase containing the concentrated malt extract and some oil and water, separately discharging the sludge and effluent phases from the locus, dividing the discharged sludge phase into two streams, returning one of the sludge streams to said locus while continuing to feed the combined filtrates into the locus and separating the same, returning the other sludge stream to the slurry and continuously mixing the same therewith, subjecting the combined filtrates to a screening operation prior to feeding the same to the locus, and returning the tailings from the screening operation to the slurry and mixing the same therewith.

2. In the production of malt extract from a cooked grain mash by subjecting the cooked grain mash to a first filtering operation and there obtaining a first filtrate containing crude malt extract and a first solid discharge, preparing a slurry including the first solids discharge and water, and subjecting the slurry to a second filtering operation and there obtaining a second filtrate containing crude malt extract and second solids discharge, the improvement which comprises combining and feeding the filtrates into a locus of centrifugal force and there separating them into sludge and effluent phases as relatively heavier and lighter constituents, respectively, the effluent phase containing the concentrated malt extract and some oil and water, separately discharging the sludge and effluent phases from the locus, dividing the discharged sludge phase into two streams, returning one of the sludge streams to said locus while continuing to feed the combined filtrates into the locus and separating the same, returning the other sludge streams to the slurry and continuously mixing the same therewith, preparing a second slurry including the second solids discharge from the second filtering operation and water, subjecting the second slurry to a third filtering operation and obtaining a third filtrate containing some crude malt extract and a third solids discharge, and feeding the third filtrate to the cooker and therein mixing the same with the grain mash.

3. In the production of malt extract from a cooked grain mash by subjecting the cooked grain mash to a first filtering operation and there obtaining a first filtrate containing crude malt extract and a first solids discharge, preparing a slurry including the first solids discharge and water, and subjecting the slurry to a second filtering operation and there obtaining a second filtrate containing crude malt extract and second solids discharge, the improvement which comprises combining and feeding the filtrates into a locus of centrifugal force and there separating them into sludge and effluent phases as relatively heavier and lighter constituents, respectively, the effluent phase containing the concentrated malt extract and some oil and water, separately discharging the sludge and effluent phases from the locus, dividing the discharged sludge phase into two streams, returning one of the sludge streams to said locus while continuing to feed the combined filtrates into the locus and separating the same, returning the other sludge stream to the slurry and continuously mixing the same therewith, preparing a second slurry including the second solids discharge from the second filtering operation and water, subjecting the second slurry to a third filtering operation and obtaining a third filtrate containing some crude malt extract and a third solids discharge, feeding the third filtrate to the cooker and therein mixing the same with the grain mash, and subjecting the third solids discharge to a drying operation whereby a product suitable for cattle feed is obtained.

4. In the production of malt extract from a cooked grain mash by subjecting the cooked grain mash to a first filtering step and there obtaining a first filtrate containing crude malt extract and a first solids discharge, preparing a slurry including the first solids discharge and water, and subjecting the slurry to a second filtering step and there obtaining a second filtrate containing crude malt extract and a second solids discharge, the improvement which comprises combining and feeding the filtrates into a first locus of centrifugal force and there separating them into sludge and effluent as heavier and lighter constituents, respectively, the effluent containing the concentrated malt extract and some oil and water, separately discharging the constituents from the locus, returning at least part of the discharged sludge constituent to the peripheral portion of the locus while continuing to feed the combined filtrates into the locus and separating the same, feeding the effluent to a second locus of centrifugal force and there separating it into a component containing the clarified malt extract and a second component comprising a mixture of grain oil and water, and separately discharging said last components from the second locus.

5. A process according to claim 4, comprising also the step of returning another part of the discharged sludge constituent to the slurry and continuously mixing the same therewith.

6. A process according to claim 4, comprising also the step of feeding the grain oil and water mixture discharged from the second locus to a third locus of centrifugal force and there separating it into grain oil and water.

7. A process according to claim 4, comprising also the step of subjecting the combined filtrates to a screening operation prior to feeding the same to the locus, and returning the tailings from the screening operation to the slurry and mixing the same therewith.

8. A process according to claim 4, comprising also the step of preparing a second slurry including the second solids discharge from the second filtering operation and water, subjecting the second slurry to a third filtering operation and obtaining a third filtrate containing some crude malt extract and a third solids discharge, feeding the third filtrate to the cooker and therein mixing the same with the grain mash.

9. A process according to claim 4, comprising also the step of preparing a second slurry including the second solids discharge from the second filtering operation and water, subjecting the second slurry to a third filtering operation and obtaining a third filtrate containing some crude malt extract and a third solids discharge, feeding the third filtrate to the cooker and therein mixing the same with the grain mash, and returning another part of the discharged sludge constituent to one of the slurries and continuously mixing the same therewith.

10. In the production of malt extract from a cooked grain mash by subjecting the cooked grain mash to a first filtering operation and there obtaining a first filtrate containing crude malt extract and a first solids discharge, preparing a slurry including the first solids discharge and water, and subjecting the slurry to a second filtering operation and there obtaining a second filtrate containing crude malt extract and a second solids discharge, the improvement which comprises combining and feeding the filtrates into a locus of centrifugal force and there separating it into three constituents, namely, sludge, effluent containing the concentrated malt extract, and a mixture of grain oil and water, separately discharging the constituents from the locus, dividing the discharged sludge constituent into two streams, returning one of the sludge streams to the peripheral portion of the locus while continuing to feed the combined filtrates into the locus and separating the same, and feeding the mixture of grain oil and water to an additional locus of centrifugal force and there separating it into grain oil and water.

11. A process according to claim 10, comprising also the step of returning the other of the sludge streams to the slurry and continuously mixing the same therewith.

12. A process according to claim 10, comprising also the step of subjecting the combined filtrates to a screening operation prior to feeding the same to the locus.

13. A process according to claim 10, comprising also the steps of subjecting the combined filtrates to a screening operation prior to feeding the same to the locus, and returning the tailings from the screening operation to slurry and mixing the same therewith.

14. A process according to claim 10, comprising also the steps of preparing a second slurry including the second solids discharge from the second filtering operation and water, subjecting the second slurry to a third filtering operation and obtaining a third filtrate containing some crude malt extract and a third solids discharge, and feeding the third filtrate to the cooker and therein mixing the same with the grain mash.

15. A process according to claim 10, comprising also the steps of preparing a second slurry including the second solids discharge from the second filtering operation and water, subjecting the second slurry to a third filtering operation and obtaining a third filtrate containing some crude malt extract and a third solids discharge, feeding the third filtrate to the cooker and therein mixing the same with the grain mash, and returning the other of the sludge streams to one of the slurries and continuously mixing the same therewith.

References Cited in the file of this patent

UNITED STATES PATENTS 2,513,687     Strezynski     July 4, 1950